US008738626B2

(12) United States Patent
Barker et al.

(10) Patent No.: US 8,738,626 B2
(45) Date of Patent: *May 27, 2014

(54) APPLICATION UPDATE SYSTEM, METHOD AND COMPUTER PROGRAM PRODUCT

(71) Applicant: salesforce.com, inc., San Francisco, CA (US)

(72) Inventors: Timothy J. Barker, San Francisco, CA (US); Ryan Lissack, San Francisco, CA (US); Daniel L. Pletter, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,317

(22) Filed: Oct. 8, 2012

(65) Prior Publication Data
US 2013/0036086 A1 Feb. 7, 2013

Related U.S. Application Data

(63) Continuation of application No. 13/016,946, filed on Jan. 28, 2011, now Pat. No. 8,312,047, which is a continuation of application No. 11/880,197, filed on Jul. 20, 2007, now Pat. No. 7,991,790.

(51) Int. Cl.
*G06F 7/00* (2006.01)
*G06F 17/30* (2006.01)

(52) U.S. Cl.
USPC ........................................ 707/737

(58) Field of Classification Search
USPC ............. 707/785, 786, 737, 784, 999.004
See application file for complete search history.

(56) References Cited

U.S. PATENT DOCUMENTS

| 6,959,308 | B2 | 10/2005 | Gramsamer et al. |
|---|---|---|---|
| 7,698,160 | B2 | 4/2010 | Beaven et al. |
| 7,818,298 | B2 | 10/2010 | Barker et al. |
| 7,836,019 | B2 | 11/2010 | Barker et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,275,836 | B2 | 9/2012 | Beaven et al. |
| 8,301,612 | B2 | 10/2012 | Barker et al. |
| 2002/0019287 | A1 | 2/2002 | Ebashi et al. |
| 2002/0019827 | A1 | 2/2002 | Shiman et al. |
| 2003/0154387 | A1 | 8/2003 | Evans et al. |
| 2006/0031308 | A1 | 2/2006 | Colson et al. |
| 2006/0053196 | A1 | 3/2006 | Spataro et al. |
| 2006/0136511 | A1 | 6/2006 | Ngo et al. |
| 2006/0143558 | A1 | 6/2006 | Albornoz et al. |

(Continued)

OTHER PUBLICATIONS

"NextPage," Jul. 6, 2006, retrieved from http://web.archive.org/web/20060706184011/http://nextpage.com/.

(Continued)

*Primary Examiner* — Aleksandr Kerzhner
(74) *Attorney, Agent, or Firm* — Zilka-Kotab, PC

(57) ABSTRACT

In accordance with embodiments, there are provided mechanisms and methods for storing documents that are being tracked in an on-demand service. These mechanisms and methods for storing documents in an on-demand service can enable embodiments to provide the sharing of documents and the storing of the documents in association with a tag. The ability of embodiments to provide the sharing of documents and the storing can enable an efficient searching for a shared document. In an embodiment, the shared document is categorized upon being stored.

14 Claims, 15 Drawing Sheets

(56) References Cited

U.S. PATENT DOCUMENTS

| | | |
|---|---|---|
| 2007/0061384 A1 | 3/2007 | Harrington et al. |
| 2007/0100817 A1 | 5/2007 | Acharya et al. |
| 2007/0150515 A1 | 6/2007 | Brave et al. |
| 2007/0220417 A1 | 9/2007 | Mathew et al. |
| 2007/0226204 A1 | 9/2007 | Feldman |
| 2007/0226807 A1 | 9/2007 | Ginter et al. |
| 2007/0260648 A1 | 11/2007 | Friesenhahn et al. |
| 2008/0104408 A1 | 5/2008 | Mayer |
| 2008/0127310 A1 | 5/2008 | Robbins et al. |
| 2008/0306883 A1 | 12/2008 | Baffier et al. |
| 2009/0024609 A1 | 1/2009 | Barker et al. |
| 2011/0252314 A1 | 10/2011 | Barker et al. |
| 2013/0036142 A1 | 2/2013 | Barker et al. |

OTHER PUBLICATIONS

Notice of Allowance from U.S. Appl. No. 13/165,548, dated Jun. 22, 2012.

Non-Final Office Action from U.S. Appl. No. 13/165,548, dated Nov. 14, 2011.

Non-Final Office Action from U.S. Appl. No. 13/647,327, dated Jul. 10, 2013.

Final Office Action from U.S. Appl. No. 13/791,825, dated Dec. 11, 2013.

FIG. 11

APPLICATION UPDATE SYSTEM, METHOD AND COMPUTER PROGRAM PRODUCT

CROSS REFERENCE TO RELATED APPLICATIONS

This application is a continuation of U.S. application Ser. No. 13/016,946, filed Jan. 28, 2011, which is a continuation of U.S. application Ser. No. 11/880,197, filed Jul. 20, 2007, all of which is incorporated herein by reference in its entirety.

The following commonly owned, co-pending United States Patents and Patent Applications, including the present application, are related to each other. Each of the other patents/applications are incorporated by reference herein in its entirety:

U.S. patent application Ser. No. 11/825,393 entitled SYSTEM AND METHOD FOR TRACKING DOCUMENTS IN AN ON-DEMAND SERVICE, by Timothy Barker et al., filed Jul. 6, 2007;

U.S. patent application Ser. No. 11/880,197 entitled SYSTEM AND METHOD FOR STORING DOCUMENTS ACCESSED BY MULTIPLE USERS IN AN ON-DEMAND SERVICE, by Timothy Barker et al., filed Jul. 20, 2007; and U.S. patent application Ser. No. 11/893,617 entitled METHOD AND SYSTEM FOR PUSHING DATA TO SUBSCRIBERS IN AN ON-DEMAND SERVICE, by Timothy Barker et al., filed Aug. 15, 2007; and U.S. patent application Ser. No. 11/879,535 entitled SYSTEM AND METHOD FOR TRACKING DOCUMENTS IN AN ON-DEMAND SERVICE, by Timothy Barker et al., filed Jul. 17, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to storing documents in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional document management systems, users access their documents stored in one logical storage space. A user of such a conventional system typically retrieves documents from, and stores documents on, the system using the user's own systems. A user system might remotely access one of a plurality of server systems that might in turn access the document management system. Document retrieval from the system might include the issuance of a query from the user system to the document management system. The document management system might process such a request received in the form of a query and might send to the user system information about documents stored in the document management system that are relevant to the request. The ability to share documents among multiple individuals, the ability to provide the retrieval of accurate information relating the shared documents, and the ability to deliver this information to the user system are desirable characteristics of document management systems in general.

Unfortunately, such conventional approaches suffer from the flaw that, searching only the shared documents for particular topics of interest may be cumbersome, because the shared documents may be located in many places and because there may be many shared documents. Additionally, a conventional categorization may be inadequate, because the categories may be inappropriate and the categorization decided upon by the classifier, if the classifier is not as familiar with the document as the users, may be inaccurate.

Accordingly, it is desirable to provide improved techniques enabling the storing and searching of a document that is being shared by multiple users of the document management system.

BRIEF SUMMARY

In accordance with embodiments, there are provided mechanisms and methods for storing documents accessed in an on-demand system. These mechanisms and methods for storing documents in an on-demand service can enable embodiments to provide the capability to locate documents quickly. The documents that are stored are also shared in a manner such that changes to the document are tracked as a safeguard that allows a user to know whether the document that they have in their possession is the most recent version.

In an embodiment and by way of example, a method for storing documents that are shared by a plurality of users on behalf of a plurality of organizations is provided. One embodiment includes receiving an original document to store on behalf of a first organization and adding a tag to the document. The tag is created by the user, and does not need to be a predefined category. The user (e.g., the document's author) creates the tag. A copy of the original document may be stored to document management storage in association with the tag. When the user saves the document, the user is presented with a choice of categories under which to save the document. The location of the document may then be used by the search engine to prune the search and/or as a search criterion. The document is classified in real time, and any user may find the document by going through the classification schedule.

In an embodiment, during the storage process the document is categorized so that the document can be easily located when a search is performed. The original document and the copy of the original document in the document management storage may be tracked by a unique identifier assigned to the original document and a corresponding unique identifier assigned to the copy of the original document stored in the document management storage. The unique identifier assigned to the copy of the original document stored in the document management storage may be tracked using a portion of a database limited to information of the first organization. Coupling with an on-demand database service enables one embodiment to provide automatically limiting access to the document management storage to the first organization and may facilitate searching for the document. Documents tracked on behalf of other organizations may likewise be stored by the same on-demand database service.

In an embodiment, after the user joins the group, documents may be downloaded from the document management storage into the user's system (e.g., into the user's desktop). In an embodiment, when a user opens one of the documents that was downloaded from the document management storage, a check is performed to determine whether the document opened is the most recent version. This check may be performed in an embodiment by comparing unique identifiers of the two copies of the document (e.g., the copy residing on the user's desktop and the copy stored by the document management system). In an embodiment, if the user's copy of the document is not the most recent version, a message may be sent to the user asking if the user wants to have the user's copy updated. In this specification, the terms "up-to-date," "current," and "most recent version" may be used interchangeably to describe various example embodiments and not as limitations.

In an embodiment, an identifier includes an identification portion, and also includes a hashed version of content of the document with which the identifier is associated. The identification portion may be used to identify that two documents at least originated from the same document, but possibly are different versions of the same document. The hashed content may be used to check whether there has been a change in content.

In an embodiment, initially a version number is checked. As a more thorough check, a hash value, such as a checksum, is checked to see if the two document contents are the same. An embodiment automatically checks version numbers to see if the user has the most recent document (as long as the user has network access or another connection to the server-side system for performing the check) without requiring the user consciously logging onto the site and without necessarily opening any browsers. In an embodiment, the identifier is the version number.

While the present invention is described with reference to an embodiment in which techniques for tracking documents in an on-demand service are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 11 shows a screenshot of an example of a search page of a website for sharing documents;

DETAILED DESCRIPTION

Figure 1:
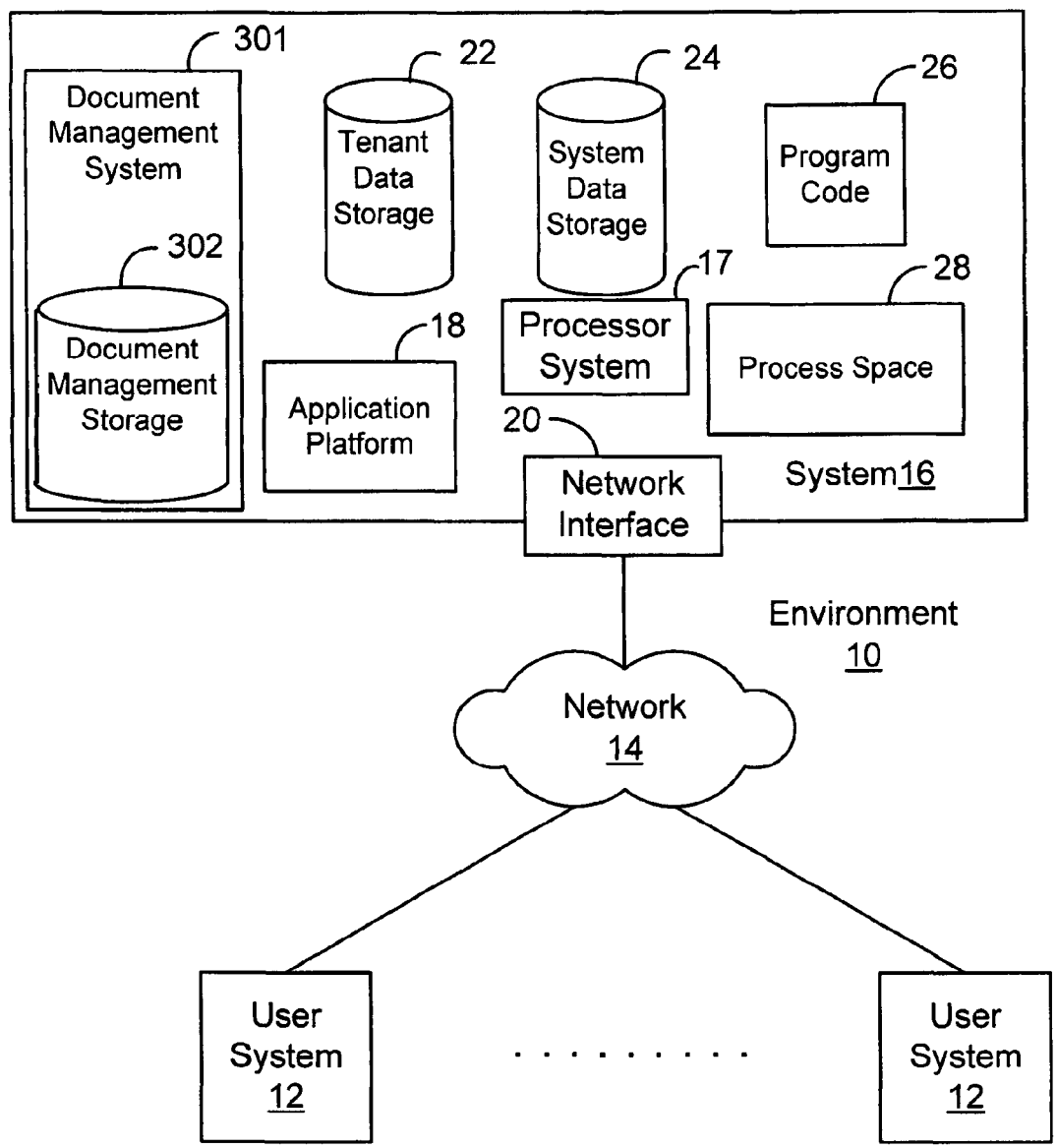
FIG. 1 illustrates a block diagram of an example of an environment in which an on-demand document management system and database service might be used.

Systems and methods are provided for storing documents in an on-demand service. One method embodiment includes receiving an original document to store on behalf of a first organization. The document is stored in document management storage in association with a tag. The tag is created by the user, and does not need to be a predefined category. Consequently, the tag may more accurately categorize the document than a predefined category. The user (e.g., the document's author) creates the tag and categorizes the document. Consequently, there is no need for an administrator that may be less familiar with the contents of the document to categorize the document.

The document management storage may be referred to as a "central depository" in some embodiments. In an embodiment, a single "master copy" of each document is stored in the document management storage. Storing the document with a tag enables searching and locating the document in a manner that is more efficient than were the tag not used. In an embodiment, the document is classified when the document is initially stored, which further facilitates locating the document. When the user saves the document, the user may be presented with a choice of categories under which to save the document. The location, category, and or tag of the document may then be used by the search engine to prune the search and/or as a search criterion. The document is classified in real time, and any user may find the document by going through the classification schedule.

Enforcing the "master copy" paradigm enables embodiments to ensure that document versioning is maintained across many different users accessing the document management storage service using any number of different computers. An identifier (ID) is associated with the document when the document is uploaded to the document management storage. In an embodiment, the identifier is embedded into the document. Alternatively, the identifier may be associated with the name or the file identifier of a document using a look up table or other technique. Yet further, the identifier may be in-part determined from characteristics of the document, such as the name, date of creation, size or the like. In an embodiment, each ID is unique system wide and/or across all tenants. In an embodiment, the identifier may be updated each time the document is edited, so by comparing identifiers a determination may be made as to whether two copies of the same document have differences in their respective contents. In an embodiment, when a member (e.g., a user) is added to a group that has access to the document management storage, an application is downloaded onto the user system for tracking documents downloaded from the document management storage and/or for updating documents downloaded to the user system. A tenant is an entity (a person, organization, group of people or other entity) that has an account on the multi-tenant system. The group is a group of people or other entities that have access to the document management storage. The members of a group may be a subset of the members of a tenant, may include multiple tenants, or may include multiple of subsets of different tenants. The documents that are managed and tracked by the document management system may be stored in the document management storage.

In an embodiment, after a user joins a group, documents may be downloaded from the document management storage into the user's system (e.g., to a storage medium on the user's system). In an embodiment, each time the user opens one of the documents that was downloaded from the document management storage, the application checks whether the document opened is the most recent version. The application may perform the check by comparing the IDs of the two copies of the document. In an embodiment, if the user's copy of the document is not the most recent version, a message may be sent to the user asking if the user wants to have the user's copy updated. Conventional approaches frequently try to address the sharing of documents using a system of locks, so that when a first user obtains control of the document, all other users are blocked from accessing the document until the first user releases the document (and frees up the lock). Unfortunately, such conventional approaches suffer from the flaw that subsequent users cannot work on the document once the first user has obtained control of it. Thus, these conventional approaches cannot be made to scale to a large number of users that desire to access a document. In contrast, in an embodiment of the current system locks are not used.

In an embodiment, the ID includes an identification portion, and a hashed version of content of the document. The identification portion identifies that two documents at least originated from the same document, but possibly are different versions of the same original document. The hashed content may be used to check whether there has been a change in content. An application automatically checks the version numbers to see if the user has the most recent document (as long as the user has network access or another connection to the server-side system for performing the check) without requiring the user consciously logging onto the site and without necessarily opening any browsers.

In an embodiment, initially a version number is checked. In alternative embodiments, a hash value, such as a checksum, may be checked to see if the two document contents are the same.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing for the searching of documents in an on-demand service will be described with reference to example embodiments.

System Overview

FIG. 1 illustrates a block diagram of an environment 10 wherein an on-demand document management system and database service might be used. Environment 10 may include user systems 12, network 14, system 16, processor system 17, application platform 18, network interface 20, tenant data storage 22, system data storage 24, program code 26, process space 28, document management system 301, and document management storage 302. In other embodiments, environment 10 may not have all of the components listed and/or may have other elements instead of, or in addition to, those listed above.

Environment 10 is an environment in which an on-demand database service coupled with a document management system exists. User system 12 may be any machine or system that is used by a user to access a database user system. For example, any of user systems 12 can be a handheld computing device, a mobile phone, a laptop computer, a workstation, and/or a network of computing devices. As illustrated in FIG. 1 (and in more detail in FIGS. 2 and 3) user systems 12 might interact via a network 14 with an on-demand database service, which is system 16, coupled with a document management system 301 and document management storage 302.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In an embodiment, a hierarchical role based model is not used. However, in systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be anyone or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes. System 16 may include document management system 301, which may include document management storage 302 supporting storage and retrieval of documents on behalf of tenants whose data is managed and housed by system 16.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a non-transitory machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other non-transitory-computer readable medium or device as is well known, such as a ROM or RAM, any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
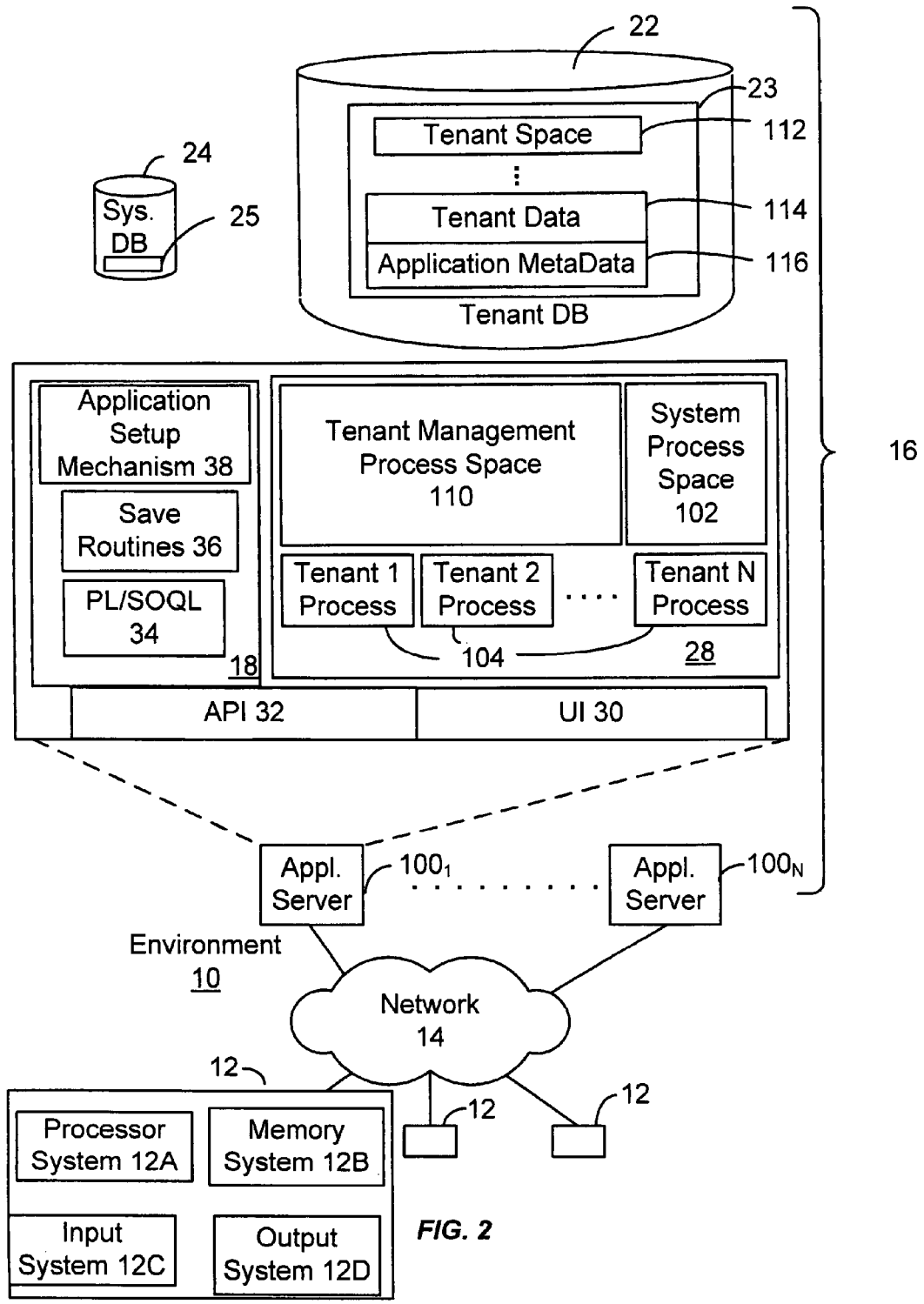
FIG. 2 illustrates a block diagram of an embodiment of elements of FIG. 1 and various possible interconnections between these elements.
Figure 3:
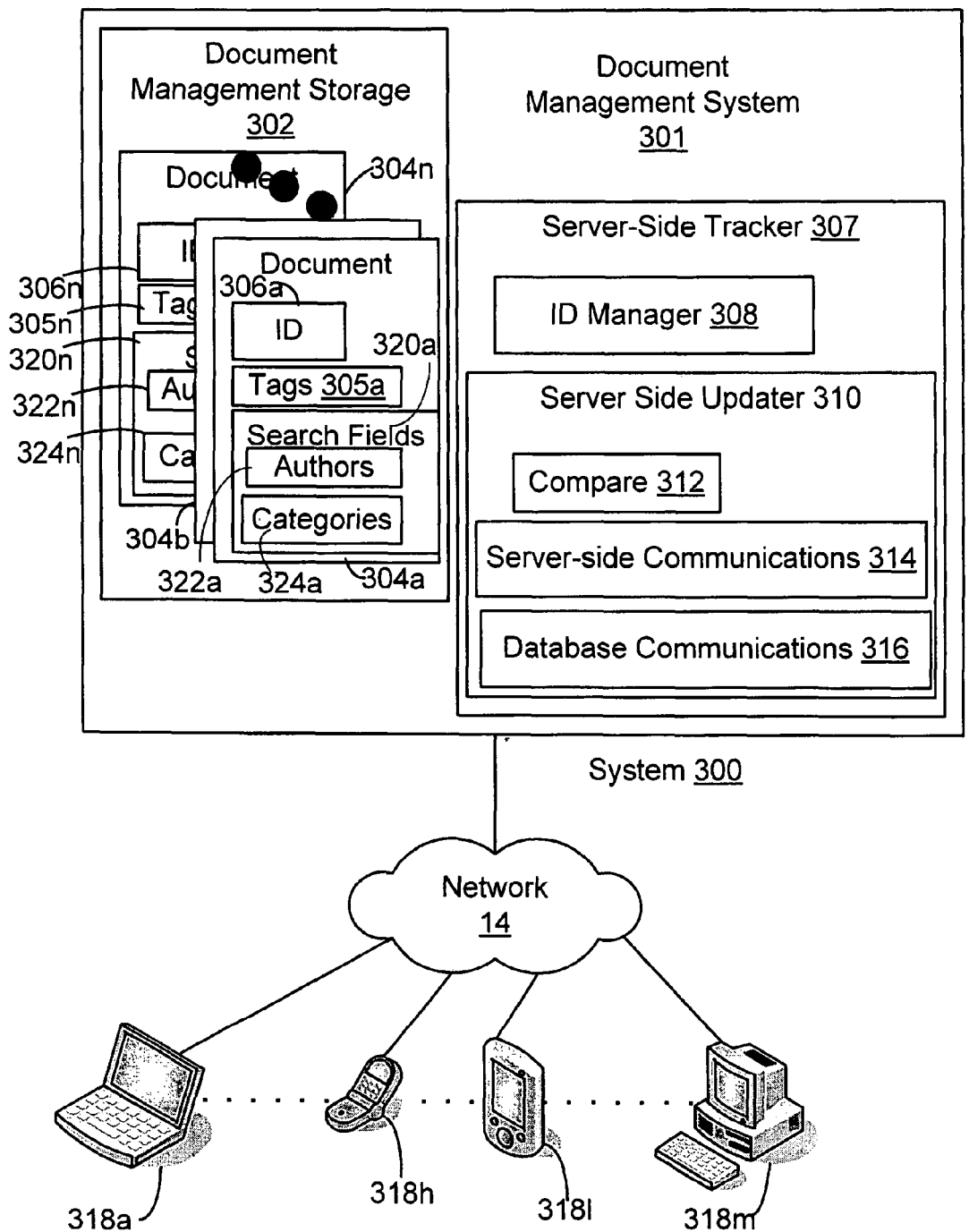
FIG. 3 shows a block diagram of an embodiment of a system including a document management system.

FIG. 2 and FIG. 3 also illustrate portions of environment 10. However, in FIGS. 2-3 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage area 112 (which may also be referred to as "tenant storage space"), user storage 114 (which may also be referred to as "user data"), and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers of one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE SYSTEM AND METHOD FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will first describe the server-side system for tracking documents. Then the client-side system for tracking documents is described. Next an ID associated with the documents will be described. Then a server-side method of tracking documents will be described. Afterwards a client side method of tracking documents will be described.

Server-Side Tracker

FIG. 3 shows a block diagram of an embodiment of system 300. System 300 may include document management system 301, which may include document management storage 302 having documents 304a-n with tags 305a-n and IDs 306a-n. Document management system 301 may also include server-side tracker 307, which in turn may include ID manager 308 and server-side updater 310. Server-side updater 310 may include compare 312, server-side communications 314, and database communications 316. System 300 may also include network 14 and network devices 318a-m. Documents 304a-n may also include or be associated with search fields 320a-n which may include authors 322a-n and categories 324a-n. In other embodiments, system 300 may not have all of the elements listed and/or may have other elements instead of or in addition to those listed.

Network 14 was discussed in conjunction with FIGS. 1 and 2. System 300 may be an embodiment of environment 10. Although in this specification, document management system 301 is described as performing various actions, it should be understood that this is a short hand for stating that the action associated with or performed by document management system 301 is performed via system 16. Document management system 301 may manage and track documents that are shared by a group of users. Document management storage 302 is a location for storing documents to which multiple people need access. Storing the documents in document management storage 302 may facilitate ensuring that there is only one master version of the latest, published version of a document and that multiple versions of the document with very different content are not created. Also, document management storage 302 may store historical versions of the document, so that the historical versions are available for access if needed. Additionally, storing the documents in document management storage 302 facilitates providing access to those that need access to the document. In an embodiment, document management storage 302 may be tenant data 114 or a location within tenant data 114.

Documents 304a-n are the documents stored in document management storage 302. Documents 304a-n may be user created documents, such as articles or sales materials.

Tags 305a-n are tags that are associated with or added to documents 304a-n, respectively. Tags 305a-n may be used for limiting the documents that need to be searched. Tags 305a-n may be keywords or phrases that one interested in finding documents 304a-n is likely to associate with documents 304a-n. Tags 305a-n tag documents 304a-n, respectively. Tags 305a-n are added by the user upon uploading and/or publishing documents 304a-n, respectively, and may be used as search parameters. The values of tags 305a-n may be used as values of keys in a database. Using tags 305a-n may reduce the number of documents that need to be searched, because only documents having the tag values of interest need to be searched.

IDs 306a-n may uniquely identify each of documents 304a-n and/or each version of each of documents 304a-n. Optionally, documents 304a-n may include multiple versions of one or more of documents 304a-n in addition to the most recent version of the documents. IDs 306a-n may include a hashed version of the documents 304a-n, which may be or may include a checksum of all of the contents of the documents 304a-n, respectively. Including a checksum of each document's contents in the document's ID allows a determination of whether the content of the document has changed. If the checksum of the ID has not changed, it is unlikely that the content of the document has changed. In an embodiment, the checksum is computed using Message Digest algorithm 5 (MD5), which computes a hash value that has a 128 bits. IDs 306a-n may include a version number, which may be used as a quick check as to whether the content of the document was changed. If the version number has changed, it is likely that content of the document has also changed. IDs 306a-n may be included within the metadata of, or otherwise embedded within documents 304a-n. In an embodiment, IDs 306a-n may be used as pointers to locations in a database where information about the document is stored. Server-Side Tracker 307 may track and update documents 304a-n. ID manager 308 creates IDs 306a-n and updates IDs 306a-n when there is a change to documents 304a-n.

Server-side updater 310 communicates with an application on one of network devices 318a-m. Server-side updater 310 receives requests to determine whether the user's version of a document is the most up-to-date version. Server-side updater 310 sends updates of documents to the user.

Compare 312 performs the comparison of an ID received from a user system 12 (FIG. 1) to one of IDs 306a-n to determine whether the user's copy of the corresponding one of documents 304a-n is the most recent. In an embodiment, a checksum may be performed to see if the document has changed. So that the value of the checksum embedded into the document does not affect a subsequent checksum of the document, before a checksum of the document is computed for the first time the identifier 000000000000 is embedded into the document, and the checksum is computed with this identifier present. Then this identifier is updated with the actual checksum of the document. When it is desired to recalculate the checksum to determine whether this document is the same as another, this document is temporarily updated by setting the checksum to all zeros. The checksum is then calculated with the temporary identifier. After the new checksum is computed, the new checksum is inserted into the document as the identifier. If the checksums are the same, then the two documents are the same. In other words, to prevent the value of the checksum from affecting the value of a new computation of the checksum, the current value of the checksum is temporarily removed, and the check sum is computed while the document contains all zeros for the checksum. The temporary value for the identifier does not need to be all zeros. The temporary value can be any value as long as the same value is used each time the checksum is created.

Server-side communications 314 handles communications with user systems 12. Server side communications 314 may be an interface between server-side tracker 307 and network interface 20 and/or application servers $100_1$-$100_N$ (FIG. 2). Optionally, server-side communications 314 may also send a client-side tracker and installation software for installing the client-side tracker to the new users (e.g., one of network devices).

Database communications 316 handles communications with tenant storage 22 (FIG. 2). Database communications 316 may be an interface between server-side tracker and a database server for tenant storage 22.

Network devices 318a-m may be embodiments of user systems 12 (FIGS. 1 and 2). The icons used for network devices 318a-m are suggestive of many different types of network devices (e.g., network appliances), such as laptops, PCs, mobile phones, and PDAs.

Search fields 320a-n are fields that may be included in the document that may be searched separately from the rest of the document (e.g., without searching the rest of the document). Authors 322a-n are one example of search fields 320a-n that may be included in the document. Authors 322a-n are names of people that are listed as the authors of the documents 304a-n. Categories 324a-n are another example of search fields 320a-n. Categories 324a-n are categories into which documents 304a-n may be classified. Each of documents 304a-n may have one or more tags, one or more authors, and one or more categories. Documents 304a-n may have other search fields in addition to or instead of authors 322a-n and categories 324a-n.

Client-Side Tracker

Figure 4:
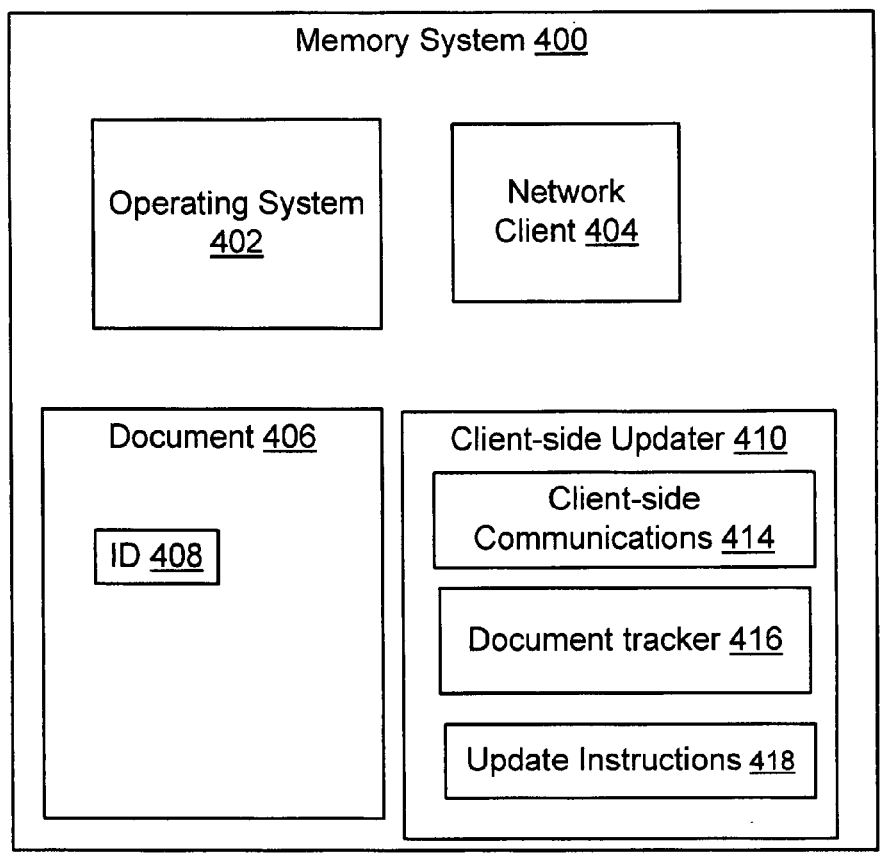
FIG. 4 shows a block diagram of the content stored in memory system of the memory management system.

FIG. 4 shows a block diagram of the content stored in memory system 400. Memory system 400 may include operating system 402, network client 404, document 406, ID 408, and client-side tracker 410 having document tracker 412, client-side communications 414, document tracker 416, and update instructions 418. In other embodiments, memory 400 may not have all of the elements listed and/or may have other elements instead of or in addition to those listed.

Memory system 400 may be an embodiment of memory system 12B (FIG. 2), which was discussed above. Operating system 402 may include a set of one or more programs that manage the hardware and software resources of the one of network devices 318a-m within which memory system 400 is incorporated, by (for example) allocating and managing tasks and internal system resources as a service to users and programs of the system based on input from the user or from that network device.

Network client 404 is an interface for communicating with other systems via network 14. Network client 404 may use any of a variety of different protocols, such as HTTP, FTP, AFS, or WAP. In an embodiment network client 404 is a browser.

Document 406 may be a copy of a version of one of documents 304a-n (FIG. 3) that was downloaded from document management system 301. ID 408 may be a copy of a version of the one of IDs 306a-n (FIG. 3) that corresponds to the one of documents 304a-n of which document 406 is a copy. ID 408 may have a value that is, or corresponds to, the value that the corresponding one of IDs 306a-n had at the time that the user downloaded or last updated document 406.

Client-side tracker 410 is an application that may update (e.g., synchronize) document 406 to agree with the corresponding one of documents 304a-n (FIG. 3) and may track the opening of document 406. Client-side tracker 410 may be downloaded from document management system 301 (FIG. 3) upon the user joining an organization associated with tenant space 112 and/or upon downloading document 406. Client side tracker 410 may participate in downloading document 406 and may store the locations in memory system 400 where document 406 is stored. Optionally, client-side tracker 410 may track changes in where document 406 is stored. Client-side tracker 410 may monitor the user's system (which is one of network devices 318a-m) for when document 406 is opened, and then client side tracker 410 may send communications to document management system 301 to determine whether document 406 is up-to-date and/or whether the user desires updating document 406.

Client-side communications 414 handles communications with server-side communications 314. Client-side communications 414 sends a request to determine whether document 406 is up-to-date by at least sending ID 408 to document management system 301. Document tracker 416 the portion of code of client-side tracker 410 that tracks the location of the document 406 and monitors the user's system to determine whether document 406 was opened Document tracker 416 may monitor whether documents that were downloaded are open (or are being opened). Document tracker 416 may, at the file-system level, hook into disk level activity to determine when files are opened, by monitoring areas of memory associated with document 406. In another embodiment, a module may be integrated into the authoring application (such as Microsoft Word) that reads files being opened to determine whether the document being opened was downloaded from document management system 301. Update instructions 418 are instructions for updating document 406. Update instructions 418 may cause the overwriting of an old version of document 406 with a new version of document 406.

An ID

Figure 5:
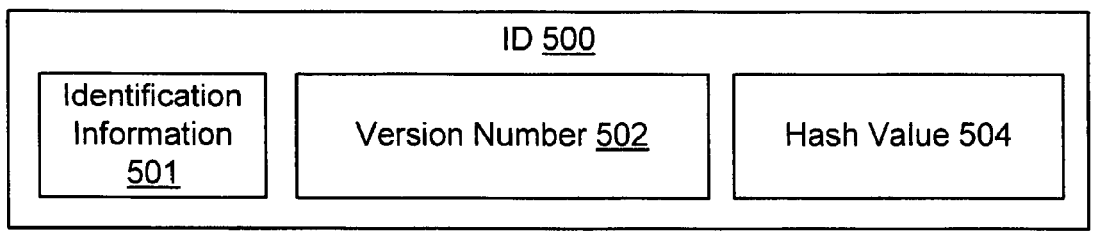
FIG. 5 shows a block diagram of an embodiment of an ID.

FIG. 5 shows a block diagram of an embodiment of ID 500. ID 500 may include identification portion 501, version number 502 and hash value 504. In other embodiments, ID 500 may not have all of the elements listed and/or may have other elements instead of or in addition to those listed.

ID 500 is an embodiment of one of IDs 306a-n. Identification portion 501 identifies the document so that two versions of the same document may be associated within one another as two versions of the same document. In an embodiment, identification portion 501 may be used as a key for locating the document in tenant storage 22. Version number 502 is a value assigned to a current version of one of documents 306a-n. Each time one of documents 306a-n is updated version number 502 is changed. Hash value 504 is the output of a hash function applied to one of documents 306a-n. Hash value 504 may be a checksum of the entire document. Each time one of documents 306a-n is updated its hash value is recalculated. Changes in hash value 504 are indicative of changes in the content of the corresponding one of documents 306a-n.

Client-Side Method of Uploading Document

Figure 6:
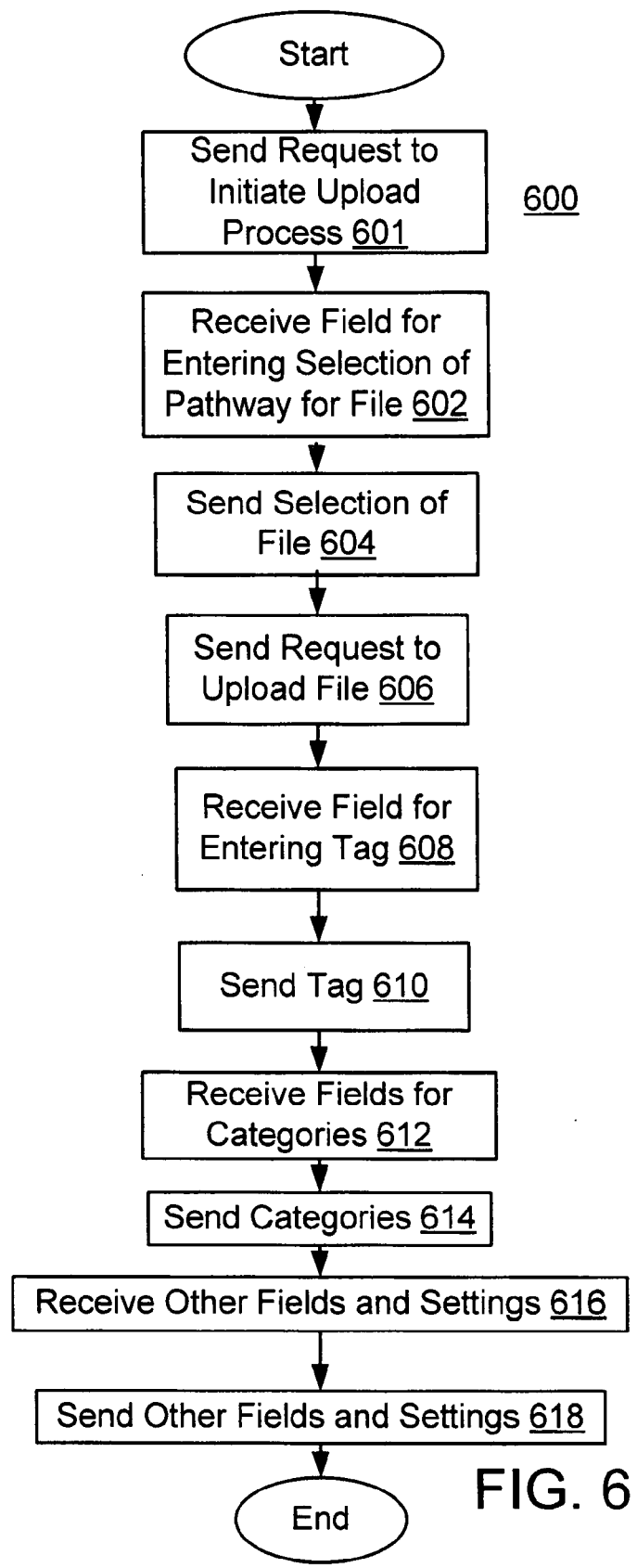
FIG. 6 shows a flowchart of an embodiment of a client-side method of uploading a document.

FIG. 6 shows a flowchart of an embodiment of a client-side method 600 of uploading a document. In step 601, user system 12 sends a request to start a process for uploading a document. For example, user system 12 may send a request to view a page that initiates a process for uploading a document. In step 602, user system 12 receives a field for entering a location of a document on user system 12. In step 604, user system 12 uploads an entry for the field to document management system 301. In step 606, document management system 301 sends a request to upload the file identified by steps 602 and 604. In step 608, a field is received by system 12 for entering a tag. In step 610, an entry for the tag is sent to document management system 301. In step 612, a field is received by user system 12 for entering a classification. In step 614, an entry for the classification is sent to document management system 301. In step 616, one or more fields are received by user system 12 for entering data for one or more search fields and/or settings. In step 618, entries for the one or more search fields and/or settings are sent to document management system 301. In an embodiment, each of the steps of method 600 is a distinct step. In another embodiment, although depicted as distinct steps in FIG. 6, steps 602-618 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Server-Side Method of Uploading Document

Figure 7:
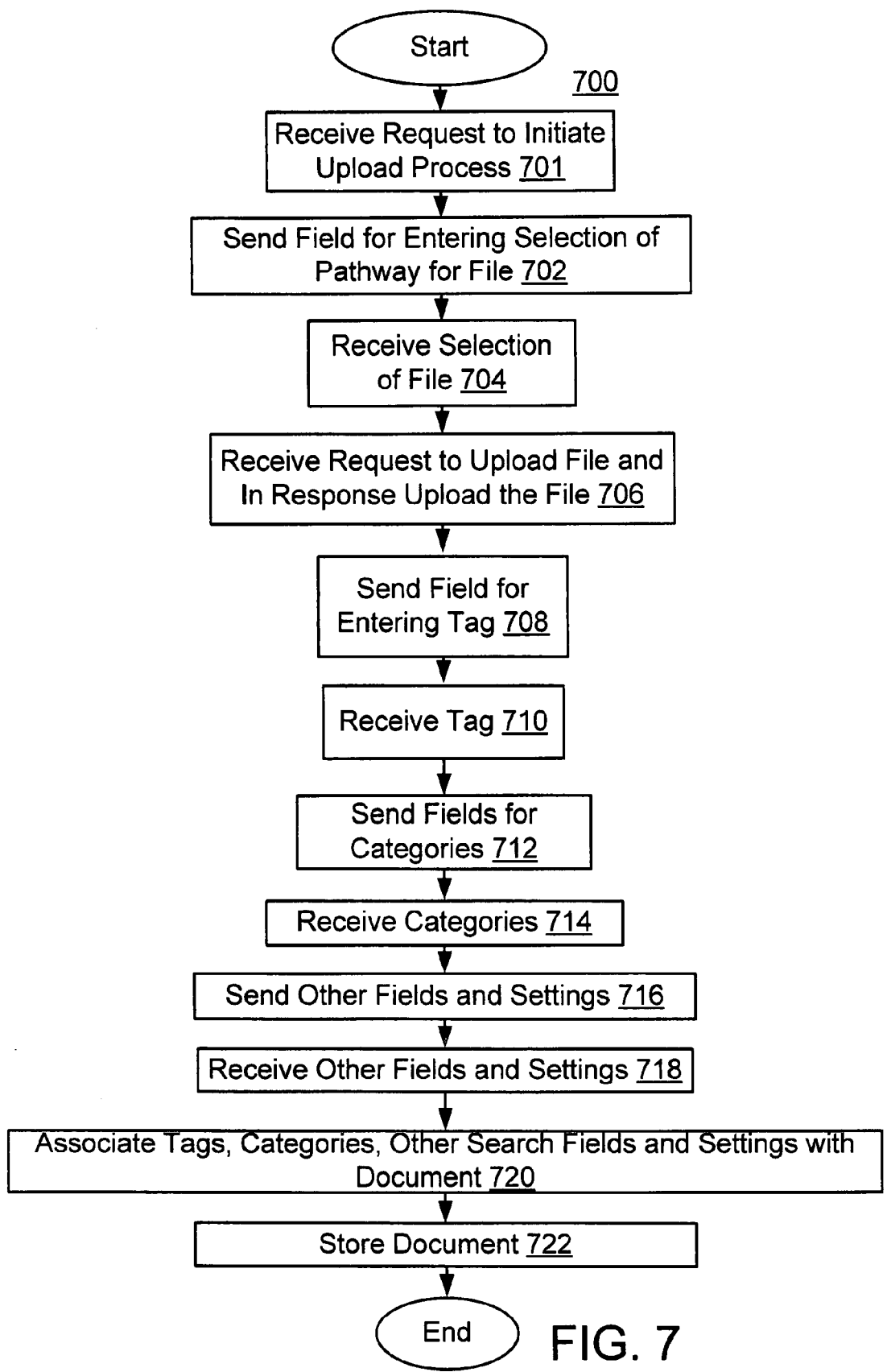
FIG. 7 shows a flowchart of an embodiment of a server-side method of uploading a document.

FIG. 7 shows a flowchart of an embodiment of a server-side method 700 of uploading a document. In step 701, document management system 301 receives a request to start a process for uploading a document. For example, user system 12 may send a request to view a web page that initiates a process for uploading a document. In step 702, document management system 301 sends a field for entering a location of a document on user system 12. In step 704 document management system 301 uploads an entry for the field to document management system 301. In step 706, document management system 301 receives a request to upload the file identified by step 702 and 704. Also, in step 706, in response to the request the file that was requested to be uploaded is uploaded. In step 708, a field is sent by user system 12 for entering a tag. In step 710, an entry for the tag is received at document management system 301. In step 712, a field is sent by user system 12 for entering a classification. In step 714, an entry for the classification is sent to document management system 301. In step 716, one or more other fields are sent by document management system 301 for entering data for one or more other search fields and/or settings. In step 718, entries for the one or more search fields are received at document management system 301. In step 720, the tag, the categories, and the search fields are associated with the document. Step 720 may include adding the tag, the category information, and/or the search field information to the document and/or storing the tag, the categories, and/or the search information in a database as entries for keys that are associated with document. In step 722, the document uploaded is stored within document management system 301. Step 722 may include setting the path of document to include a resource that is shared by a group of users that includes a group of users to which the user associated with user system 12 is a member. Steps 720 and 722 may part of the same step. For example, the storing of the tag, the categories, and/or the search information in a database as entries for keys that are associated with document may be part of the storing process of step 722. In an embodiment, each of the steps of method 700 is a distinct step. In another embodiment, although depicted as distinct steps in FIG. 7, steps 702-722 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

Client-Side Method of Searching for Document

Figure 8:
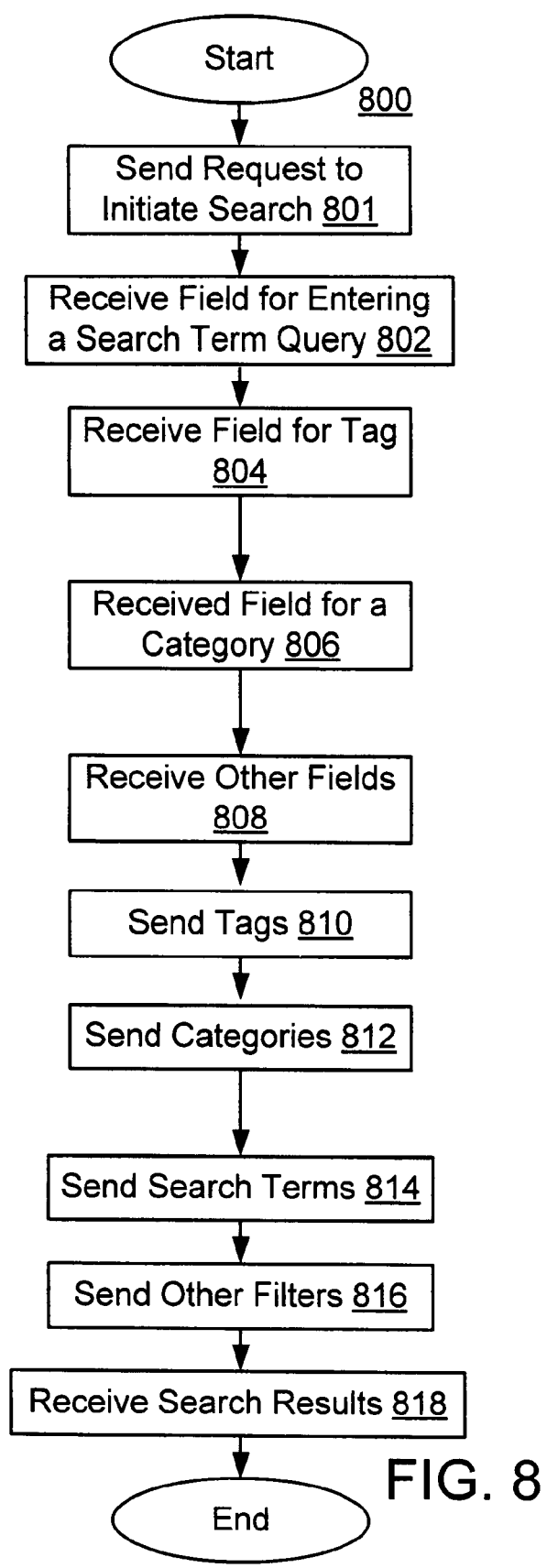
FIG. 8 shows a flowchart of an embodiment of a client-side method of searching for a document.

FIG. 8 shows a flowchart of an embodiment of a client-side method 800 of searching for a document. In step 801, user system 12 sends a request to start a search for a document. For example, user system 12 may send a request to view a webpage with entry fields for a search query for a document. In step 802, user system 12 receives a field for entering a search term, such as a keyword or keyword combination. In step 804, a field is received by user system 12 for entering a tag. In step 806, a field is received by user system 12 for entering a category. In step 808, one or more fields are received by system 12 for entering data for one or more other filters, such as other search fields. Steps 802, 804, 806, and 808 may be performed by receiving one webpage having fields for entering the search term, the tag, the category, and the other filters. In step 810, user system 12 sends an entry for the tag to document management system 301. In step 812, user system 12 sends an entry for the category to document management system 301. In step 814, user system 12 send entries for one or more search terms are sent to document management system 301. In step 816, user system 12 sends entries for the one or more other filters are sent to document management system 301. Some examples of other filters that may be included as part of step 816 are the authors, the workspace, and/or the format. In step 818, search results are received at user system 12 from document management system 301 based on the information sent in the prior steps of method 800. In an embodiment, after every entry and/or update to any field that affects the search results step 818 is performed again, and new search results are presented. In an embodiment, each of the steps of method 800 is a distinct step. In another embodiment, although depicted as distinct steps in FIG. 8, steps 802-818 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Server-Side Method of Searching for Document

Figure 9:
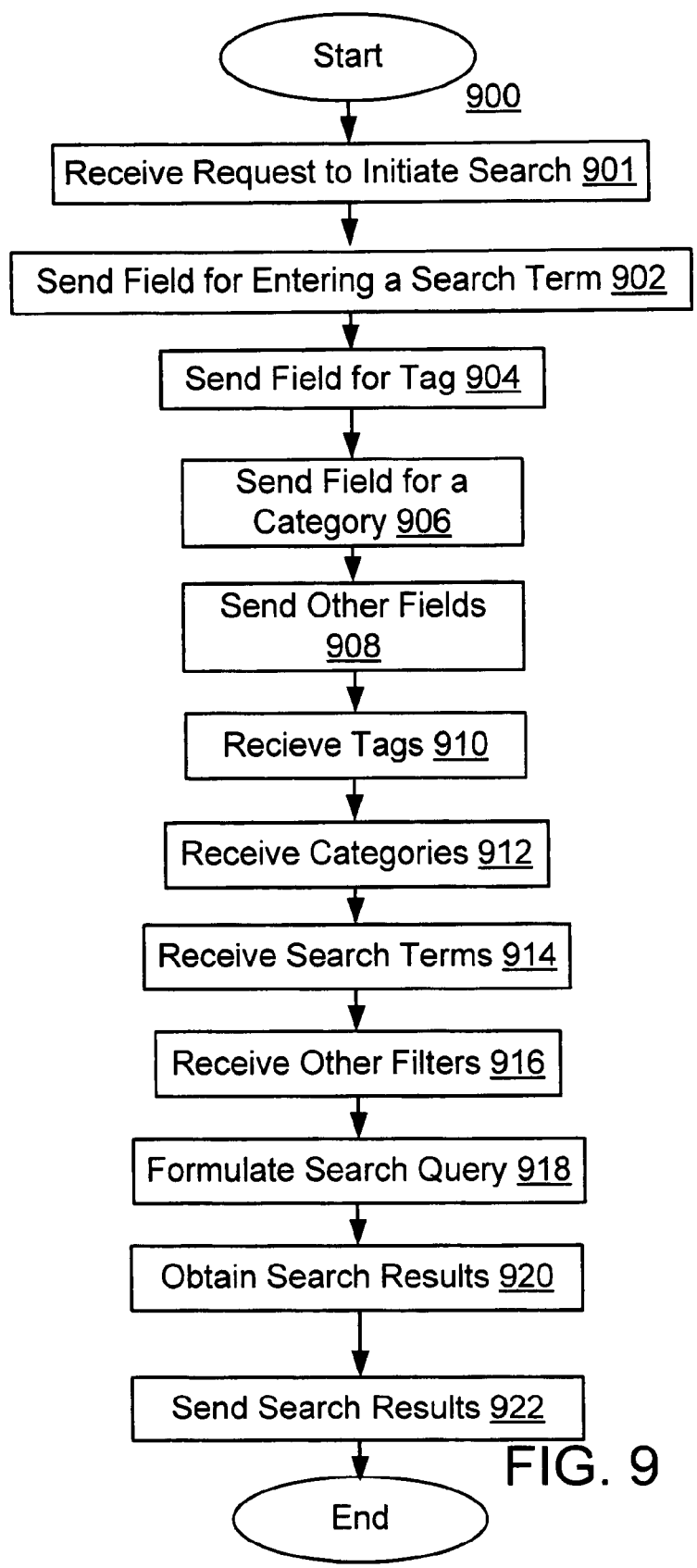
FIG. 9 shows a flowchart of an embodiment of a server-side method of searching for a document.

FIG. 9 shows a flowchart of an embodiment of a server-side method of searching for a document. In step 901, document management system 301 receives a request to start a search for a document. For example, document management system 301 may receive a request to view a webpage that has fields in which data can be entered for a search query for a document. In step 902, document management system 301 sends a field for entering a search term, such as a keyword or keyword combination. In step 904, document management system 301 sends a field to user system 12 for entering a tag. In step 906, document management system 301 sends a field to user system 12 for entering a category. In step 908, one or more fields are sent from document management system 301 (e.g., via system 16 of FIG. 1) to user system 12 for entering data for one or more other filters, such as other search fields. Steps 902, 904, 906, and 908 may be performed by sending one webpage having fields for entering the search term, the tag, the category, and the other filters. In step 910, document management system 301 receives an entry for a tag from user system 12. In step 912, document management system 301 receives at least one entry for the category from user system 12. In step 914, document management system 301 receives at least one an entry for the search terms from user system 12, which may be keywords. In step 916, document management system 301 receives entries for the one or more other filters from user system 12. In step 918, a query is automatically formulated based on the data received at document management system 301. The query may be a database query. In step 920 results of the query are obtained as a result of implementing the machine instructions that implement the query. Step 918 may include determining which documents correspond to the database keys specified by the query. In step 922, search results are sent from document management system 301 to user system 12.

In an embodiment, each of the steps of method 900 is a distinct step. In another embodiment, although depicted as distinct steps in FIG. 9, steps 902-922 may not be distinct steps. In other embodiments, method 900 may not have all of the above steps and/or may have other steps in addition to or instead of those listed above. The steps of method 900 may be performed in another order. Subsets of the steps listed above as part of method 900 may be used to from their own method.

Screen Shots

Figure 10:
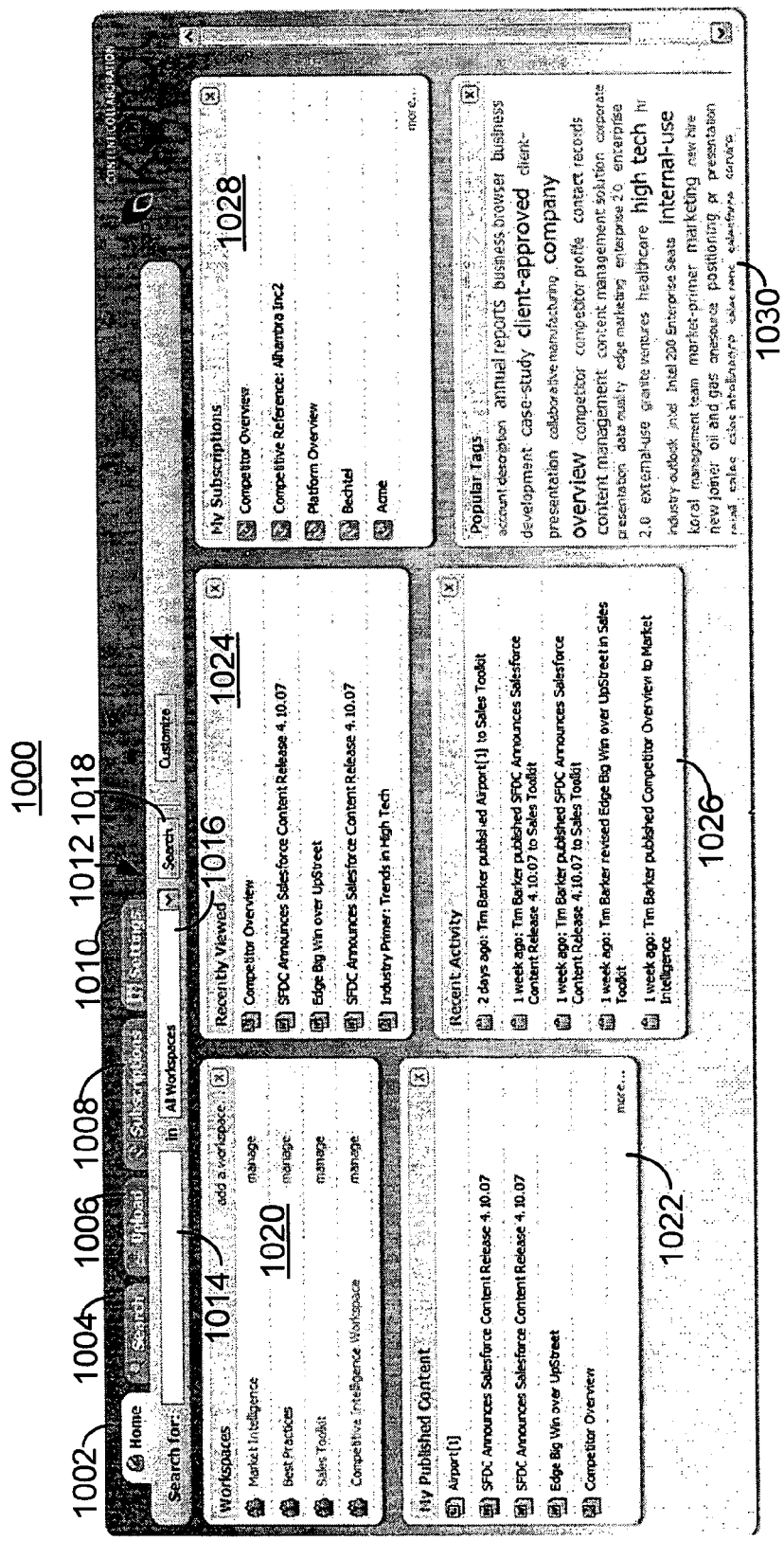
FIG. 10 shows a screenshot of a homepage of a website for sharing documents.

FIG. 10 shows a homepage 1000 of a website for viewing and updating shared documents. Homepage 1000 may include home tab 1002, search tab 1004, upload tab 1006, subscriptions tab 1008, settings tab 1010, search bar 1012 having search term field 1014, filter 1016, and search button 1018. Homepage 1000 also include workspaces box 1020, my published content box 1022, recently viewed box 1024, recent activity box 1026, my subscriptions box 1028, and popular tags box 1030. In other embodiments, homepage 1000 may not have all of the elements listed and/or may have other elements instead of or in addition to those listed.

Homepage 1000 displays a variety of types of information that a user may want to monitor and/or interact with. Homepage 1000 may include links to other pages. In an embodiment, homepage 1000 may include a variety of documents that are located in different boxes. Selecting one of the documents in one of the boxes causes a webpage to be presented that shows information about the document. In an embodiment, when the user's cursor hovers over an icon for one of the documents some of the information listed in the document webpage may be displayed, such as the author and the number of votes received for and/or against the document.

Home tab 1002 is a tab that brings a user to homepage 1000 if the user is not already viewing homepage 1000 and/or refreshes homepage 1000. In other words, although if the user selects home tab 1002 while viewing homepage 1000, the page being viewed remains homepage 1000, but may be refreshed. Additionally, home tab 1002 may also be available from other webpages, and if home tab 1002 is selected while on another webpage, the user is brought to homepage 1000. Search tab 1004, when selected, brings the user to a webpage that allows the user to select other options that related to performing a search (the webpage associated with search tab 1004 is discussed in conjunction with FIG. 11). Upload tab 1006, when selected, brings the user to a webpage that includes links and/or instructions for uploading a file to document management storage 302 (the webpage associated with upload tab 1006 is discussed in conjunction with FIG. 12). Subscription tab 1008 brings the user to a webpage that allows the user to initiate and/or modify a subscription to documents updated and/or published within document management storage 302. Settings tab 1010 brings a user to a webpage that allows a user to set and/or modify settings related to documents, the user's account, and/or other accounts (the webpage associated with settings tab 1010 is discussed in conjunction with FIG. 13).

Search bar 1012 includes one or more links and/or fields that allow a user to formulate a search query. As a result of interacting with search bar 1012, a search may be conducted for documents meeting the search query that are stored within document management storage 302. For example, search term field 1014 allows a user to enter a combination of keywords, which may be used as part of a search query, and filter 1016 may allow the user to select from a menu of filters that have already been associated with document management system 301. Some examples of filters that may be included within filter 1016 are discussed in conjunction with FIG. 12. In an embodiment, if no filter is selected and filter 1016 is left blank, all search fields, categories, tags, and authors are searched for the keywords that were entered into search term field 1014.

Search button 1018, when selected, initiates a search based on a search query formulated from the current entries in search term filed 1014 and filter 1016. After the search has been initiated, document management system 301 switches the webpage presented to user system 12 to the search page, and presents results of the search to the user. After the search webpage is presented to the user, the user is allowed to refine the search. The search page is discussed below in conjunction with FIG. 11.

Workspaces box 1020 lists work spaces that currently exist. Selecting one of the workspaces causes a list of documents stored in that work space to be presented to the user. In an embodiment, upon presenting a list of the documents in the workspace selected, the webpage presented to the user is changed to the search page.

My published content box 1022 lists the documents that the user published. Recently viewed box 1024 lists documents that user has viewed recently. Recent activity box 1026 lists documents containing recent activity of the user. The information displayed may include whether the document was published, how long ago the document was created or added to document management storage 302, and the date that the document was released to the public, if the document was released, for example. My subscriptions box 1028 lists documents to which the user has a subscription. Popular tags box 1030 lists the more popular tags that were added and/or associated with various documents. In an embodiment, the tags that are more popular (e.g., the tags that appear in more documents) are presented in a larger font. In an embodiment, the more popular the tab the larger the font.

Figure 11:
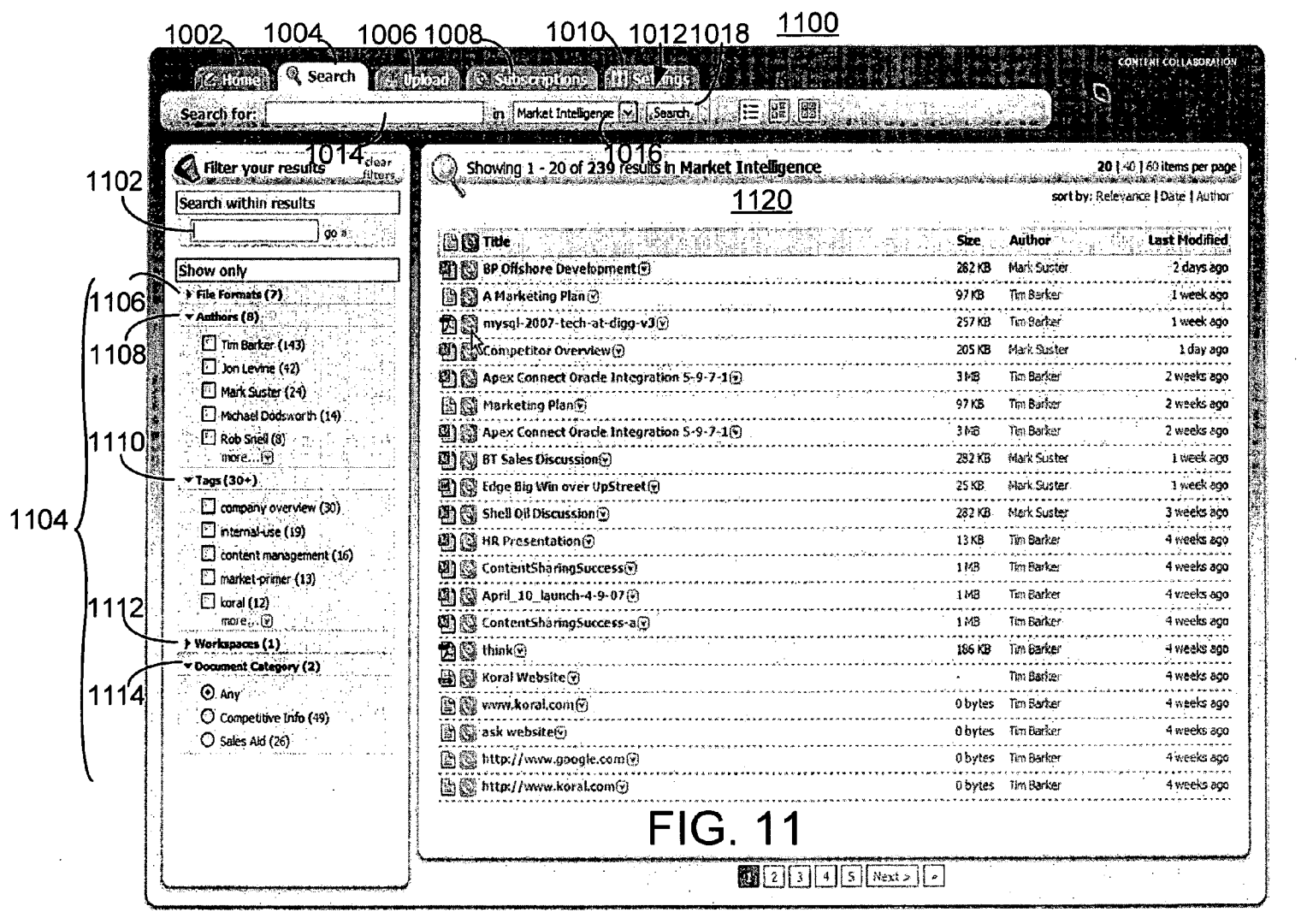

FIG. 11 shows an example of search page 1100. Search page 1100 may include home tab 1002, search tab 1004, upload tab 1006, subscriptions tab 1008, and settings tab 1010, search bar 1012 having search term field 1014, filter 1016, and search button 1018. Search page 1100 may also include search within field 1102 and filters 1104. Filters 1104 may include file format 1106, authors 1108, tags 1110, workspaces 1112, and categories 1114. Search page 1100 may also include results box 1120. In other embodiments, search page 1100 may not have all of the elements listed and/or may have other elements instead of or in addition to those listed.

Home tab 1002, search tab 1004, upload tab 1006, subscriptions tab 1008, and settings tab 1010, search bar 1012 having search term field 1014, filter 1016, and search button 1018 were explained above in conjunction with FIG. 10.

Field 1102 allows the user to enter further search terms. In an embodiment, all search fields, categories, tags, and authors are searched for the keywords that were entered into search term field 1102. However, the search is limited to the documents that resulted from the search query formed by words entered into search term field 1014 and filter 1016, and the search is further limited by the tags, categories, authors, workspaces, or other filters selected by the user. In other words, initially, the documents displayed on search page 1100 may be the results of a search using the search terms in search term field 1014 and the filters of filter 1016, and the search formed search term field 1102 and any other filters, categories, workspaces, authors, or tags the user selects are used to search the results of the search conducted as a result of entering terms into search term field 1014 and selecting one of the filters of filter 1016. In an embodiment, if search field term 1014 and filter 1016 are blank all of the documents of document management storage 302 are listed on search page 1100. Upon entering search terms in field 1102 the documents listed on search page 1100 are further limited to those documents that have the search terms in search term fields 1014 and field 1102 that also are not removed by filter 1016. Similarly filters 1104 further limit the documents listed on the search page 1100 to those that are not removed by filters 1104. Tags 1110 may be used to select the tags to which the search results will be limited. Workspaces 1112 allows the user to specify the workspaces from which the search results will be taken. Categories 1114 allows the user to list the categories from which the search results will be taken from. A search for the terms entered into search term field 1102 may be conducted only within documents that (1) have the tags specified by tags 1110, (2) are within the workspaces specified by work spaces 1112, and/or (3) that are also within the categories specified by categories 1114. In other embodiments there may be other combinations of types of filters that are used to formulate the search query. Results box 1120 displays the search result from the search associated with (e.g., entered via) search page 1100.

Figure 12:
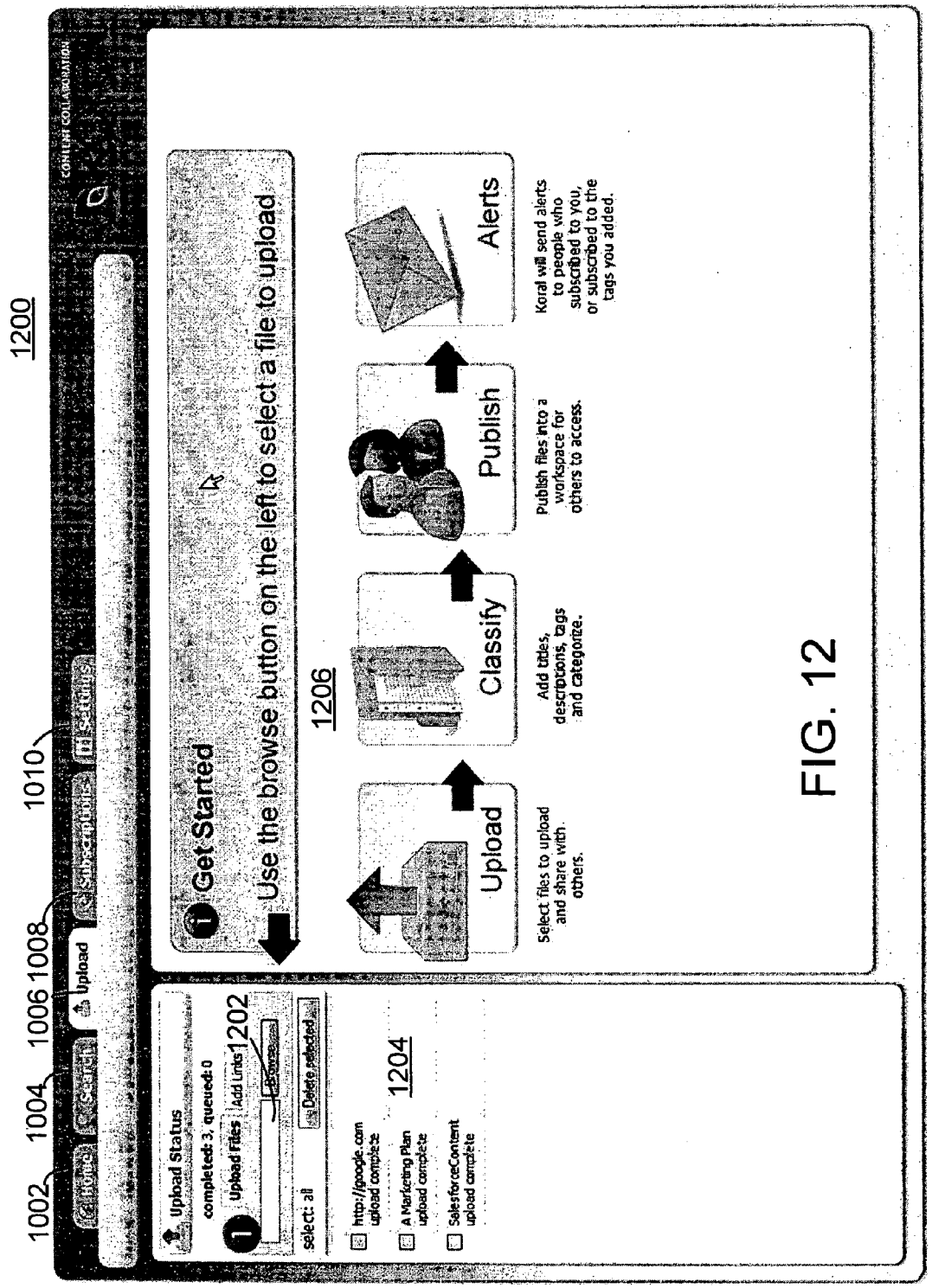
FIG. 12 shows a screenshot of an example of an upload page of a website for sharing documents.

FIG. 12 shows an example of upload page 1200. Upload page 1200 may include home tab 1002, search tab 1004, upload tab 1006, subscriptions tab 1008, and settings tab 1010. Upload load page 1200 may include browse box 1202, progress box 1204, and instructions 1206. In other embodiments, upload page 1200 may not have all of the elements listed and/or may have other elements instead of or in addition to those listed.

Upload page 1200 may be used by one of the members of a group having access to the shared documents for uploading a document, which may be added to document management storage 302 for sharing with the group. Home tab 1002, search tab 1004, upload tab 1006, subscriptions tab 1008, and settings tab 1010 were explained above in conjunction with FIG. 10. Browse box 1202 allows a user to browse for a file to upload. Browse box 1202 may be used for locating the document that is to be uploaded. Progress box 1204 displays a list of the documents that are being uploaded and an indication of how much of the document has been uploaded. Instructions 1206 lists instruction for uploading a document.

Figure 13:
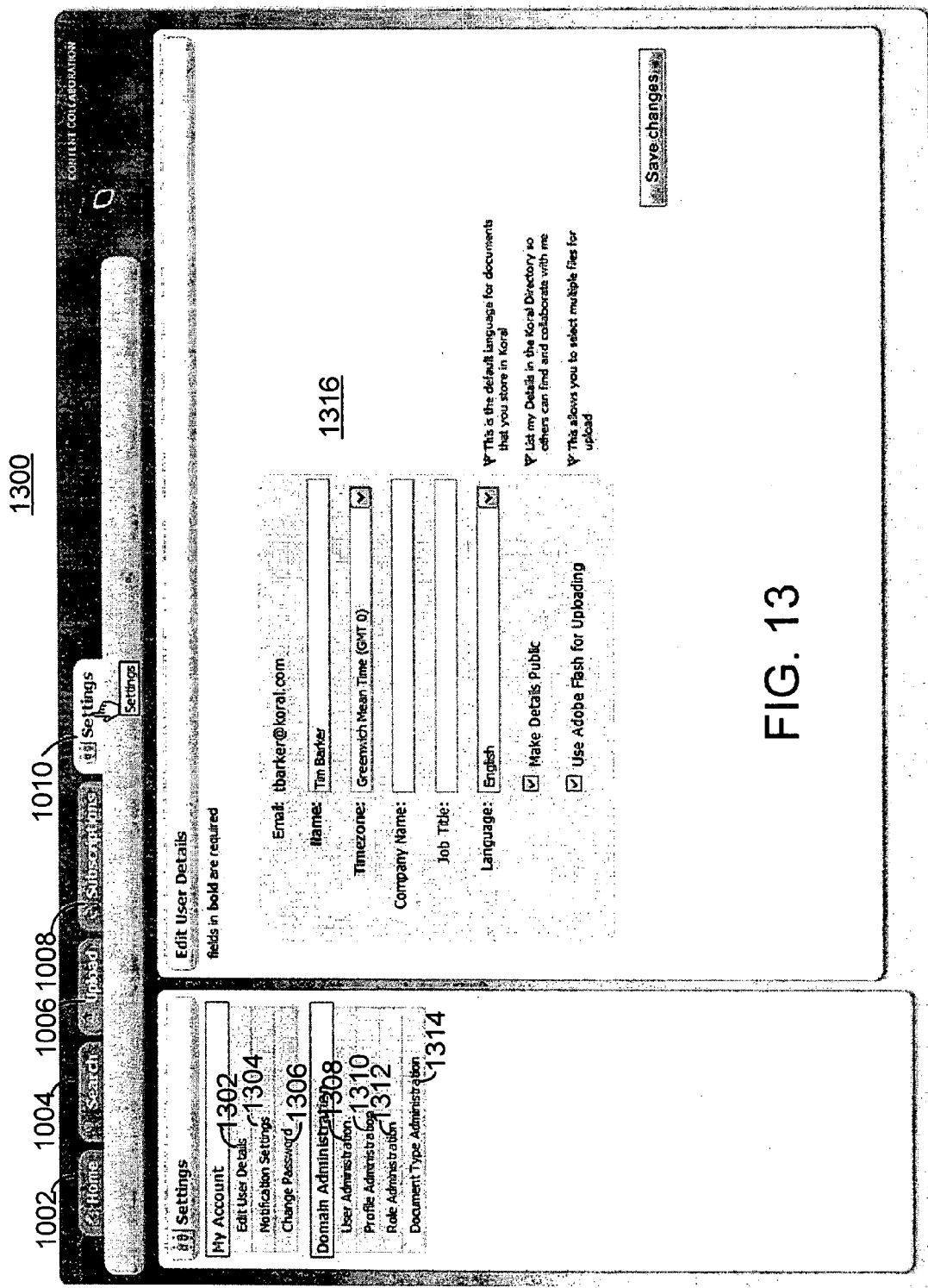
FIG. 13 shows a screenshot of an example of a settings page of a website for sharing documents.

FIG. 13 shows an example of settings page 1300. Settings page 1300 may include home tab 1002, search tab 1004, upload tab 1006, subscriptions tab 1008, and settings tab 1010. Settings page may include user detail 1302, notification settings 1304, change password 1306, user administration 1308, profile administrations 1310, role administration 1312, document type administration 1314, and edit box 1316. In other embodiments, settings page 1300 may not have all of the elements listed and/or may have other elements instead of or in addition to those listed.

Home tab 1002, search tab 1004, upload tab 1006, subscriptions tab 1008, and settings tab 1010 were explained above in conjunction with FIG. 10. User details 1302 may allow the users to enter information about themselves, such as their names, e-mail address, company name, job title, time zone, and the language that the user uses on the website. User details 1302 may include information about the user that is used for setting up an account and/or managing the user's account.

Notification settings 1304 include settings that relate to the form in which the user will be automatically notified of changes to documents and the frequency with which the user will be notified of changes to the document. In an embodiment, the notifications that are associated with notifications settings 1304 may occur regardless of whether the user downloaded or opened a version of the document to user system 12. Notification settings 1304 may include a choice of whether to send the notification via e-mail, and/or a Really Simple Syndication (RSS) feed. Notification settings 1304 may allow a user to choose whether to receive notification nightly as part of a batch of updates that occurred the previous day or as the changes occur in the document. Notification settings 1304 may allow a user to indicate whether to automatically subscribe the user to any document that the user comments upon. Change password 1306 may allow a user to change their password.

User administration 1308 includes options that allow an administrator to add users and/or remove users. For example, user administration 1308 may include a link that causes the sending of an invitation for a potential user to become a new user of document management system 301. User administration 1308 may include a link that disables a user, enables a user, and/or resets a password of a user. User administration 1308 may allow an administrator to view a list of users, their e-mail addresses, and/or other information about the users. User administration 1308 may include a field for entering a search string for searching for a user.

Profile administrator 1310 may allow the creation of profiles, removal of profiles, and/or the assignment and/or change of privileges associated with a given profile. A profile assigned to a user may determine the workspaces that the user can access and a combination of one or more roles in which the user can access that workspace. For example, one profile may allow access to workspace A only as a viewer and to workspace B as a commentator. A profile may have a set of actions that are allowed. For example one profile may allow the creation of roles, while another profile may allow the viewing of roles, but not the creation of roles. Each profile may have a set of web pages that are viewable by a user having that profile. For example, one profile may not allow a user to view the settings tab, or may render a settings webpage with fewer options available for modification. A profile may be used for defining a group of users that have access to a particular set of shared documents.

Role administration 1312 allows the administrator to setup and/or edit the roles that are available to be assigned to a user. Role administrator 1312 may allow an administrator to change, add and/or remove the privileges that are associated with each role. Role administrator 1312 may be capable of adding new roles. Some examples of some roles may be viewer, commentator, administrator, and/or application exchange user. A given user may be assigned multiple roles. For example, if a user is assigned only the roles of commentator and viewer, then the user may be allowed to add comments about documents and view documents, but may not have the privileges associated with an administrator or application exchange user.

Document type administration 1314 allows the user to edit, add and/or remove the document types that are available for assigning to any given document. A document type is a description of a type of document. A document that is assigned a document type has one or more characteristics that are described by the document type. Some examples of document types may be competitive information, competitive alert, business operations, industry briefing, marketing campaign, research publication, and sales aid. Each document type may have properties associated with that document type. A property is a description of one or more characteristics that are associated with a document type. Examples of the properties associated with a type may be competitor, approved for client use, and industry. Each property may have a list of possible values and the administrator may be able to select whether that list is available to choose in a pick list (or other property values menu), whether the value is a required property of the type, and/or whether the property is available to use as a filter while searching. For example, the document type business operations may have a property titled business operations, which in turn may be capable of assuming the values of attrition, procurement, credit collections, general, and/or order management.

Figure 14:
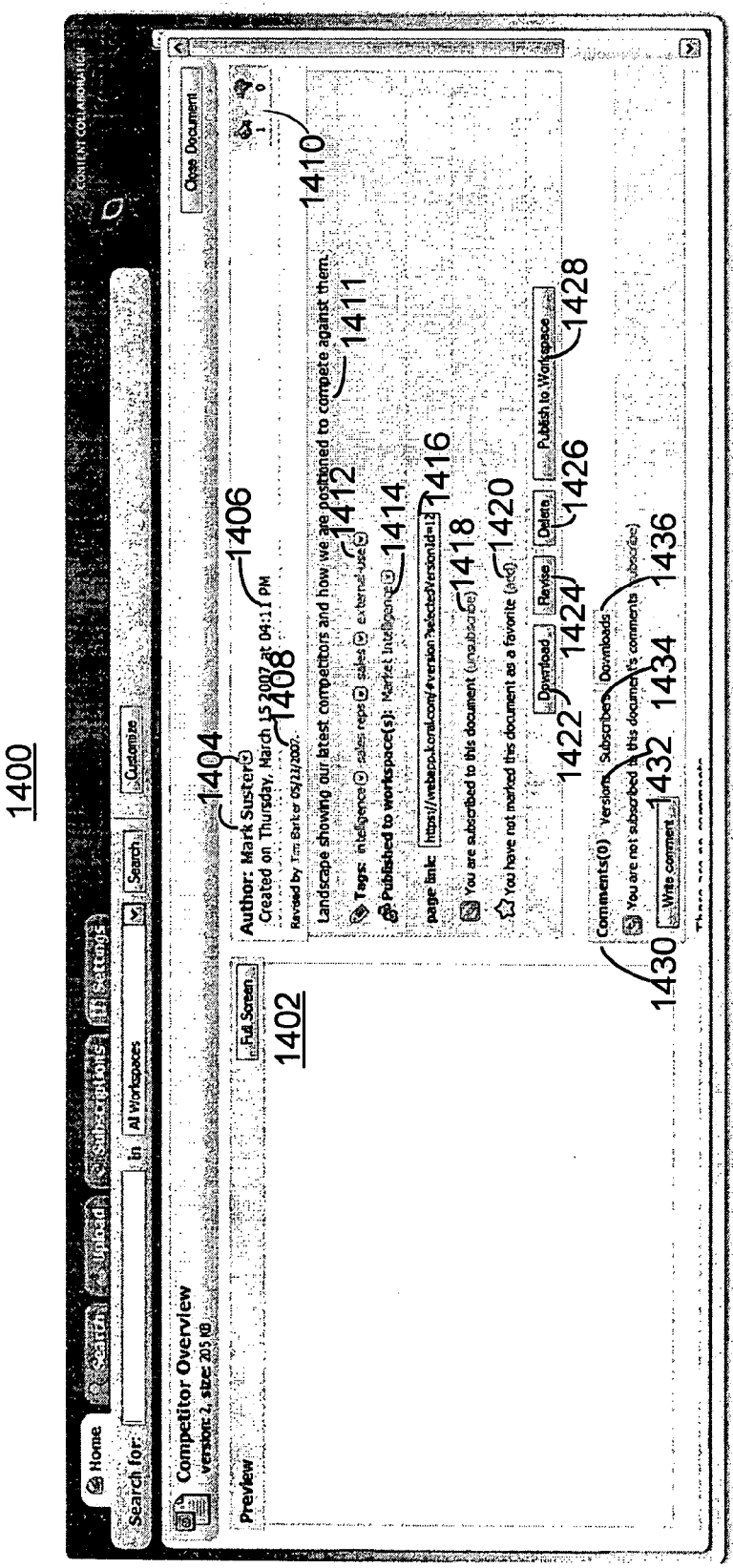
FIG. 14 shows a screens hot of an example of a document page of a website for sharing documents.

FIG. 14 is a screenshot of an embodiment of a document webpage 1400 for viewing details about a document. Document webpage 1400 includes preview 1402, author 1404, creation date 1406, revision data 1408, vote 1410, description 1411, tags 1412, workspace 1414, page link 1416, subscription indication 1418, favorites indication 1420, download button 1422, revise button 1424, delete button 1426, publish to workspace button 1428, comments tab 1430, version tab 1432, subscribers tab 1434 and downloads tab 1436. In other embodiments, document webpage 1400 may not have all of the elements listed and/or may have other elements instead of or in addition to those listed.

Document webpage 1400 includes information about a document stored in document management storage 302. Selecting one of the documents in one of the boxes of homepage 1000 or search page 1100 causes a document webpage 1400 to be rendered and thereby presented. Preview 1402 shows an excerpt of the document. Author 1404 includes the name or an identifier of the author of the document. Creation date 1406 is the date at which the document was created or first uploaded to document management system 301. Revision data 1408 may include the name of the last person to revise the document and/or the date of the most recent revision. Vote 1410 is an indication of how many people voted for and/or against the document. There may also be a link for placing a vote for and/or against the document. Description 1411 may include a brief description of the document. Tags 1412 are a list of tags that are associated with the document. Workspace 1414 is a list of workspaces where the document was stored. Page link 1416 is a link to the location where the document is stored. Subscription indication 1418 indicates whether the current user is subscribed to the document. Subscription indication 1418 may include a button that initiates and/or terminates a subscription to a document. Favorites indication 1420 indicates whether the current user has the document included within the user's list of favorite documents to view, each listing in the favorites list being associated with a link (e.g., a shortcut) to that document. Favorites indication 1420 may include a button that adds and/or removes the document from being on a list of favorite documents to view. Download button 1422 initiates a download of the document from document management system 301 to user system 12. Revise button 1424 initiates a process that allows the user to revise the document. Delete button 1426 causes the document to be deleted. Publish to workspace 1428 causes the document to be published to a workspace where other members of the group may view and/or edit the document. In step 1428, a document revised via revise button 1424 may be placed into transitional storage pending approval for publication to the workspace. Comments tab 1430 brings the user to a webpage that allows the user to view comments added by other users and/or add comments about the document. Version tab 1432 brings the user to a webpage that allows the user to view other versions (e.g., older versions) of the document. Subscribers tab 1434 brings the user to a page that allows the user to view a list of subscribers.

Method for Using the Environment (FIGS. 1 and 2)

Figure 15:
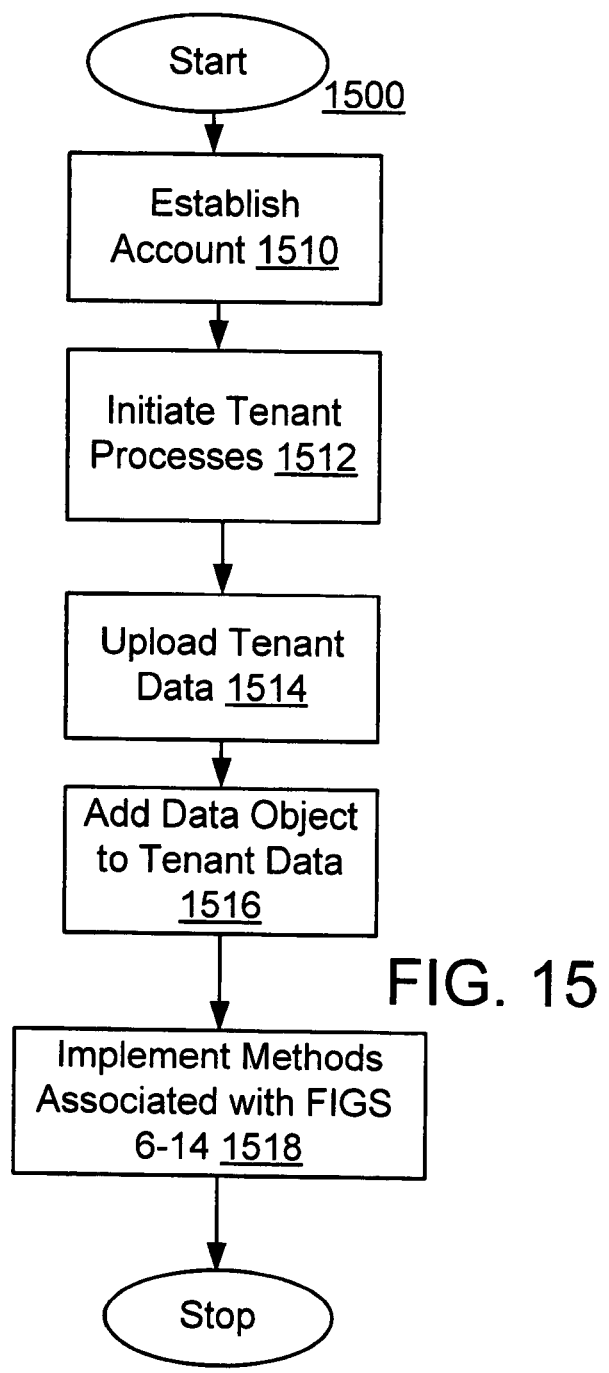
FIG. 15 illustrates a flowchart of an embodiment of a method of using the environment of FIG. 1.

FIG. 15 shows a flowchart of an example of a method 1500 of using environment 10. In step 1510, user system 12 (FIGS. 1 and 2) establishes an account. In step 1512, one more tenant process space 104 (FIG. 2) are initiated on behalf of user system 12, which may also involve setting aside space in tenant space 112 (FIG. 2) and tenant data 114 (FIG. 2) for user system 12. Step 1512 may also involve modifying application metadata to accommodate user system 12. In step 1514, user system 12 uploads data. In step 1516, one or more data objects are added to tenant data 114 where the uploaded data is stored. In step 1518, methods associated with FIGS. 6-14 may be implemented. The user of method 1500 may represent an organization that is a tenant of system 16 (FIG. 1), and the users of methods associated with FIGS. 6-14 may only be associated with the tenant. In an embodiment, each of the steps of method 1500 is a distinct step. In another embodiment, although depicted as distinct steps in FIG. 15, steps 1502 1518 may not be distinct steps. In other embodiments, method 1500 may not have all of the above steps and/or may have other steps in addition to or instead of those listed above. The steps of method 1500 may be performed in another order. Subsets of the steps listed above as part of method 1500 may be used to form their own method.

Method for Creating the Environment (FIGS. 1 and 2)

Figure 16:
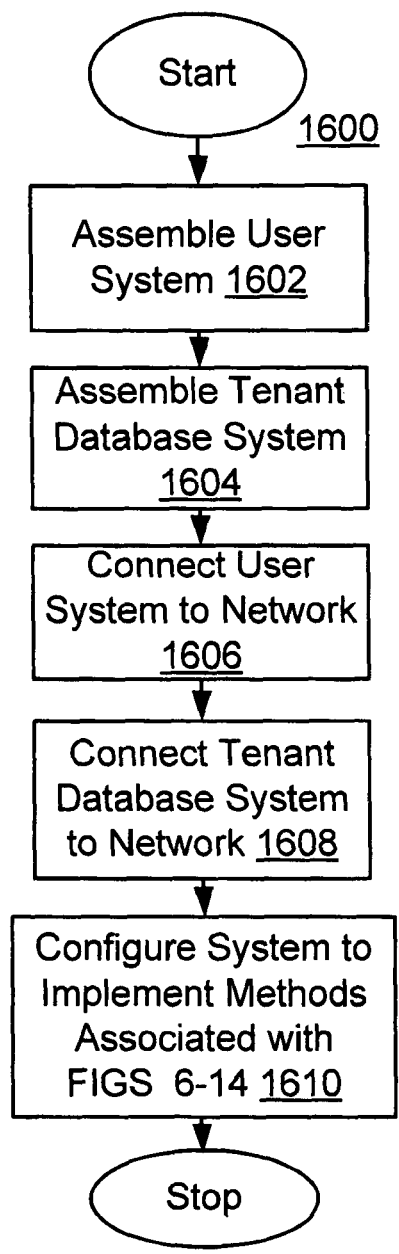
FIG. 16 illustrates a flowchart of a method of making the environment of FIG. 1.

FIG. 16 is a method of making environment 10, in step 1602, user system 12 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1604, system 16 (FIGS. 1 and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers $100_1$-$100_N$, system process space 102, tenant process spaces 104, tenant management process space 110, tenant space 112, tenant data 114, and application metadata 116 (FIG. 2).

In step 1606, user system 12 is communicatively coupled to network 14. In step 1608, system 16 is communicatively coupled to network 14 allowing user system 12 and system 16 to communicate with one another (FIG. 2). In step 1610, one or more instructions may be installed in system 16 (e.g., the instructions may be installed on one or more machine readable media, such as computer readable media, therein) and/or system 16 is otherwise configured for performing the steps of methods associated with FIGS. 6-14. For example, as part of step 1610, one or more instructions may be entered into the memory of system 16 for creating document management storage 302, transferring documents to the document management storage, implementing server-side tracker 307, generating and updating IDs 306a-n, uploading documents, storing documents, searching for documents, and/or inviting users to join a group that is authorized to access the document management storage 302 (FIG. 3). In an embodiment, each of the steps of method 1600 is a distinct step. In another embodiment, although depicted as distinct steps in FIG. 16, steps 1602-1608 may not be distinct steps. In other embodiments, method 1600 may not have all of the above steps and/or may have other steps in addition to or instead of those listed above. The steps of method 1600 may be performed in another order. Subsets of the steps listed above as part of method 1600 may be used to form their own method.

Extensions and Alternatives

In an embodiment, a timestamp of the last time that the document was altered may be included in ID 500 instead of, or in addition to, version number 502 and/or hash value 504 (FIG. 5). In an embodiment, only one of version number 502 and hash value 504 is included in ID 500. In an embodiment, version number 502 is a value that is incremented every time that that document is altered. In an embodiment, version number 502 is a value that is decremented every time that a document is altered.

In an embodiment only the latest approved version of a document is available for viewing by users. For example, a first user downloads a document to their user system. Then a second user updates the document in the system. System 16 may be configured to route document changes entered by the second user to a workflow, so that document changes can be approved before being published. While the document in undergoing an approval workflow (in other words, prior to the changes being approved), if the first user opens the document the first user will not be notified of any of the changes made by the second user, because the first user is still viewing the latest approved document. When the document is approved, the first user would be notified if the document is opened on the first user's desktop.

In an embodiment, the downloading of a document from document management storage 302 (FIG. 3) to the user's system may entail the following steps on the client side. In one of the steps the user sends a request for a copy of one of documents 304a-n (FIG. 3). In one of the steps, the user's system receives a copy of the document (document 406 of FIG. 4). In one of steps the document is stored in a location in memory 400 (FIG. 4). In one of the steps client-side tracker 410 (FIG. 4) records the location of where document 400 is located, so that client-side tracker 410 only needs to monitor the locations to where the documents were downloaded in order to determine whether one of the documents downloaded from document management system 301 (FIG. 3) was opened. In another embodiment, upon installation or at another time, the user designates a particular location where all documents that were downloaded from document management system 301 will be stored, and when downloading a document from document management system 301, client-side tracker 410 ensures that the document is stored in the designated location. Alternatively, client-side tracker 410 tracks the entire user system or is triggered to launch by the opening of document 406 (FIG. 4). In an embodiment, the client-side tracker 410 may include a file browser for browsing documents in document management storage 302.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method, comprising:
receiving at a host system, a document to store on behalf of a first organization from a client machine;
receiving a tag from the client machine for storing in association with the document;
storing in a storage accessible to the host system, the document in association with the tag, the document being stored to document management storage; and
associating by the host system, the document in the document management storage with a unique identifier;
allowing a level of access to the document to be granted to multiple users that are members of the first organization, the level of access allowing a plurality of users to at least edit the document, and store the document that was edited on the host system as a master copy of the document;
wherein the document stored in the document management storage and copies of the document are tracked using a portion of a database limited to information of the first organization;
associating by the host system, the document with one or more of a plurality of document types chosen from a list of document types, each of the document types including one or more properties associated with a list of properties, each property describing one or more characteristics associated with the document type that is associated with the document; and
receiving values for one or more search fields, the one or more search fields being different from the tag, the document types, and the properties; and
wherein the one or more search fields include at least a field for one or more of an author of the original document, a name of a workspace, and a document format.

2. The method of claim 1, further comprising allowing the user to freely choose a name of the document, the name of the document not requiring segmentation.

3. The method of claim 1, wherein the unique identifier is associated with a name or a file identifier of the document using a look up table.

4. The method of claim 1, further comprising: receiving a category and storing the document in association with the category.

5. The method of claim 1, further comprising: entering values for one or more search fields, the one or more search fields being different from the tag.

6. The method of claim 5, the one or more fields include a field for the name of a workspace.

7. The method of claim 1, wherein the database is a multi-tenant database, the organization exists independently of the database, the organization existed prior to becoming a tenant, and the organization is allowed to store within the portion of the document management storage, multiple documents that are each tracked and that may each be edited by multiple members of the organization; and the organization is one of multiple tenants of the multi-tenant database.

8. The method of claim 1, wherein the database is an on-demand multi-tenant database.

9. The method of claim 8, the first organization being one of a plurality of organizations that are tenants of the multi-tenant database, the portion of the database that is limited to information of the first organization, is one of a plurality of portions of the database, each of the plurality of portions of the database being limited to storing information for a different one of the plurality of organizations.

10. The method claim 1, the portion of the database that is limited to the first organization includes one or more workspaces; the storing of the of document in the document management storage includes publishing the document in a workspace selected from the one or more workspaces; and a given user must be have access to the workspace in which the document is published to have access to the document.

11. The method of claim 1, wherein the tag is not part of the unique identifier.

12. The method of claim 1, wherein the user of the client machine is presented with a popular tags box that lists one or more tags that have been previously associated with various prior documents stored in the document management storage.

13. A non-transitory computer readable medium storing thereon one or more instructions, which when implemented causes a processor to implement a method, the method comprising: receiving at a host system, a document to store on behalf of a first organization from a client machine;
receiving a tag from the client machine for storing in association with the document;
storing in a storage accessible to the host system, the document in association with the tag, the document being stored to document management storage; and
associating by the host system, the document in the document management storage with a unique identifier;
allowing a level of access to the document to be granted to multiple users that are members of the first organization, the level of access allowing a plurality of users to at least edit the document, and store the document that was edited on the host system as a master copy of the document;
wherein the document stored in the document management storage and copies of the document are tracked using a portion of a database limited to information of the first organization;
associating by the host system, the document with one or more of a plurality of document types chosen from a list of document types, each of the document types including one or more properties associated with a list of properties, each property describing one or more characteristics associated with the document type that is associated with the document; and
receiving values for one or more search fields, the one or more search fields being different from the tag, the document types, and the properties; and
wherein the one or more search fields include at least a field for one or more of an author of the original document, a name of a workspace, and a document format.

14. A system, comprising:
a host system having a processor system, volatile memory, and non-volatile memory; the non-volatile memory including at least one machine readable medium carrying one or more sequences of instructions which when implemented causes the processor system to implement a method comprising:
receiving at the host system, a document to store on behalf of a first organization from a client machine;
receiving a tag from the client machine for storing in association with the document;

storing in a storage accessible to the host system, the document in association with the tag, the document being stored to document management storage; and associating by the host system, the document in the document management storage with a unique identifier;

allowing a level of access to the document to be granted to multiple users that are members of the first organization, the level of access allowing a plurality of users to at least edit the document, and store the document that was edited on the host system as a master copy of the document;

wherein the document stored in the document management storage and copies of the document are tracked using a portion of a database limited to information of the first organization;

associating by the host system, the document with one or more of a plurality of document types chosen from a list of document types, each of the document types including one or more properties associated with a list of properties, each property describing one or more characteristics associated with the document type that is associated with the document; and receiving values for one or more search fields, the one or more search fields being different from the tag, the document types, and the properties; and wherein the one or more search fields include at least a field for one or more of an author of the original document, a name of a workspace, and a document format.

* * * * *